US010783493B2

(12) United States Patent
Chen et al.

(10) Patent No.: US 10,783,493 B2
(45) Date of Patent: Sep. 22, 2020

(54) METHOD AND DEVICE FOR PROCESSING TRANSACTION INFORMATION OF MERCHANDISE OBJECT ASSEMBLY

(71) Applicant: CAINIAO SMART LOGISTICS HOLDING LIMITED, Grand Cayman (KY)

(72) Inventors: Yueyang Chen, Hangzhou (CN); Hao Jiang, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 278 days.

(21) Appl. No.: 15/982,836

(22) Filed: May 17, 2018

(65) Prior Publication Data
US 2018/0268368 A1 Sep. 20, 2018

Related U.S. Application Data

(63) Continuation of application No. PCT/CN2016/105667, filed on Nov. 14, 2016.

(30) Foreign Application Priority Data

Nov. 23, 2015 (CN) .......................... 2015 1 0819005

(51) Int. Cl.
*G06Q 10/08* (2012.01)
*G06Q 30/06* (2012.01)
(52) U.S. Cl.
CPC ..... *G06Q 10/0875* (2013.01); *G06Q 10/0833* (2013.01); *G06Q 10/08355* (2013.01); *G06Q 30/0633* (2013.01)
(58) Field of Classification Search
CPC ........... G06Q 10/0875; G06Q 10/0833; G06Q 30/0633; G06Q 10/08355
(Continued)

(56) References Cited

U.S. PATENT DOCUMENTS 6,315,513 B1 11/2001 Harukawa et al.
6,952,681 B2 * 10/2005 McQuade .............. G06Q 10/08
705/22
(Continued)

FOREIGN PATENT DOCUMENTS

CA 2823402 C 4/2018
CN 101027690 A 8/2007
(Continued)

OTHER PUBLICATIONS

Notice to Submit Response dated Dec. 11, 2019, issued in related Korean Patent Application No. 10-2018-7017885, with English machine translation (23 pages).
(Continued)

*Primary Examiner* — Andrew Joseph Rudy
(74) *Attorney, Agent, or Firm* — Sheppard Mullin Richter & Hampton LLP

(57) ABSTRACT

A method may comprise: receiving, by a front-end transaction central server, a browse request for browsing detailed information of a combined merchandise object, and acquiring stock information of each sub-merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, providing salable information of the combined merchandise object; and when a request for buying the merchandise object is received, generating a transaction order, and determining the target physical warehouse as a prerouting warehouse of the first sub-merchandise object, and determining the target virtual negative sale warehouse
(Continued)

as a prerouting warehouse of the second sub-merchandise object.

20 Claims, 8 Drawing Sheets

(58) Field of Classification Search
USPC ....... 705/22, 26.1, 26.2, 26.81, 28; 235/380, 235/383, 385
See application file for complete search history.

(56) References Cited

U.S. PATENT DOCUMENTS

| | | | |
|---|---|---|---|
| 7,552,871 B2* | 6/2009 | Ainasoja | G06F 16/3329 |
| | | | 235/385 |
| 7,610,219 B2* | 10/2009 | Sayed | G06Q 30/0641 |
| | | | 705/26.2 |
| 7,668,782 B1* | 2/2010 | Reistad | G06Q 30/06 |
| | | | 705/50 |
| 7,685,023 B1 | 3/2010 | Abraham et al. | |
| 7,725,366 B1 | 5/2010 | Franco | |
| 8,744,977 B2 | 6/2014 | Amling et al. | |
| 9,189,768 B2 | 11/2015 | Plaster et al. | |
| 9,595,018 B2 | 3/2017 | Carvajal | |
| 9,805,402 B1* | 10/2017 | Maurer | G06Q 10/087 |
| 10,373,281 B2* | 8/2019 | Lutnick | G06Q 30/0635 |
| 2001/0032146 A1 | 10/2001 | Kutaragi et al. | |
| 2007/0011053 A1 | 1/2007 | Yap | |
| 2008/0065500 A1 | 3/2008 | Foth et al. | |
| 2009/0106100 A1 | 4/2009 | Mashinsky | |
| 2009/0125350 A1 | 5/2009 | Lessing et al. | |
| 2014/0279294 A1 | 9/2014 | Field-Darragh et al. | |
| 2015/0058067 A1 | 2/2015 | Yuen et al. | |
| 2015/0262298 A1 | 9/2015 | Callaway et al. | |
| 2015/0310384 A1* | 10/2015 | Chen | G06Q 30/0635 |
| | | | 705/26.81 |
| 2016/0125354 A1* | 5/2016 | Kang | G06Q 10/087 |
| | | | 705/28 |
| 2016/0140469 A1 | 5/2016 | Chen | |

FOREIGN PATENT DOCUMENTS

| | | |
|---|---|---|
| CN | 101996351 A | 3/2011 |
| CN | 102609868 A | 7/2012 |
| CN | 203237666 U | 10/2013 |
| CN | 103426072 A | 12/2013 |
| CN | 101790740 B | 9/2014 |
| CN | 104809602 A | 7/2015 |
| CN | 103426072 B | 2/2016 |
| CN | 102292737 B | 5/2016 |
| JP | H05-250394 A | 9/1993 |
| JP | 2001-222577 A | 8/2001 |
| JP | 2002-304452 A | 10/2002 |
| JP | 2007-524937 A | 8/2007 |
| KR | 10-2014-0070154 A | 6/2014 |

OTHER PUBLICATIONS

International Search Report and Written Opinion for Application No. PCT/CN2016/105667, dated Feb. 16, 2017, 8 pages.
Notice of Reasons for Refusal dated Jun. 11, 2019, issued in related Japanese Application No. 2018-545537, with English machine translation (8 pages).
PCT International Preliminary Report on Patentability dated Jun. 7, 2018, issued in related International Application No. PCT/CN2016/105667, with English machine translation (12 pages).
First Search dated Jan. 10, 2020, issued in related Chinese Patent Application No. 201510819005.1 (1 page).
First Office Action dated Jan. 21, 2020, issued in related Chinese Patent Application No. 201510819005.1, with English machine translation (7 pages).

* cited by examiner

METHOD AND DEVICE FOR PROCESSING TRANSACTION INFORMATION OF MERCHANDISE OBJECT ASSEMBLY

CROSS-REFERENCE TO RELATED APPLICATIONS

The present application is a continuation application of International Patent Application No. PCT/CN2016/105667, filed on Nov. 14, 2016, which is based on and claims priority to Chinese Patent Application No. 201510819005.1, filed on Nov. 23, 2015 and entitled "METHOD AND DEVICE FOR PROCESSING TRANSACTION INFORMATION OF MERCHANDISE OBJECT ASSEMBLY." The above-referenced applications are incorporated herein by reference in their entirety.

TECHNICAL FIELD

The present application relates to the field of merchandise object information processing technologies, and in particular, to methods and devices for processing transaction information of a combined merchandise object.

BACKGROUND

On e-business sales platforms, the most traditional sales mode is the regular mode of sales of goods in stock, which requires the presence of actual warehouse stocks before the sales, and the goods can be shipped immediately after a user places an order and pays off the whole amount. In the mode of sales of goods in stock, therefore, having goods in stock in a warehouse is a prerequisite for a business to have normal sales. However, trade demand changes frequently. A business may replenish the stock periodically or with a delay, and as a result, how much stock is appropriate is often a difficult question. If the stock is too high, there will be a risk that the goods become overstocked. If the stock is too low, the sales performance will be affected.

To enable a business to plan stocking goods more flexibly, e-business sales platforms also provide a presale mode, in which there is no mandatory requirement for actual warehouse stocks, and front-end sales can be performed as long as a certain amount of presale virtual stocks is set up. A buyer can first pay a deposit when placing an order, and then pay the balance when the pre-sale period is close to end. A business can replenish goods in a warehouse during the period from the deposit payment to the balance payment. As such, a business can perform presales when there is no stock, and then replenish the goods according to the actual sales, and perform shipping delivery.

Apparently, the presale manner enables a business to replenish the stock according to actual situation of orders, thus achieving accurate distribution of goods and preventing overstock and understock. Nevertheless, sales of goods in stock has its own advantages. For example, a buyer just needs to make one payment before waiting for receiving shipments. Moreover, the goods can be shipped to the buyer as early as possible as long as the warehouse has them in stock. In practical applications, therefore, both the sales of goods in stock and presales are common sales modes.

However, there may be the following situations in actual applications: in some cases, a merchandise object is one merchandise object at the time of sales at the front end, but corresponds to two or more sub-merchandises in a back-end warehouse. Such a front-end merchandise object may usually be referred to as a "combined merchandise object." For example, an air conditioner typically comprises two parts, an internal unit and an external unit. For consumers' convenience to purchase, the two parts can be combined into one front-end combined merchandise object, "air conditioner," for sale at a front end. In a back-end warehouse, the internal unit and the external unit are actually two independent sub-merchandises having independent respective stocks.

According to the prior art, however, it is typically required that each sub-merchandise of a combined merchandise object adopts the same sale mode, for example, sales of goods in stock for all, or presales for all. If different sub-merchandises have different sale modes, the front-end combined merchandise will become unavailable. Alternatively, two sub-merchandises can also be presented as independent merchandise objects at a front end, and they will no longer present as a combined merchandise object. However, if a consumer still needs to buy all the sub-merchandises in such a case, the consumer has to place multiple orders, or place one order after adding all sub-merchandises into a "shopping cart," which increases the complexity of operations and will also occupy more system resources.

Therefore, configuring flexible sale modes for sub-merchandises of a merchandise object assembly is a technical problem for those skilled in the art to solve.

SUMMARY

The present disclosure provides methods and devices for processing transaction information of a combined merchandise object, which enable a combined merchandise object to have more sales opportunities, facilitate operations of a second user, and conserve system resources. Some methods described below may be performed by one or more servers including, for example, a front-end transaction central server, a logistic central server, and/or a shipment central server.

According to one aspect, a method for processing transaction information of a combined merchandise object comprises: receiving, by one or more servers, a browse request for browsing detailed information of a combined merchandise object, and acquiring, by the one or more servers, stock information of each sub-merchandise object of the combined merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, providing salable information of the combined merchandise object; and when a request for buying the combined merchandise object is received, generating a transaction order, and upon generation of prerouting information, determining the target physical warehouse as a prerouting warehouse of the first sub-merchandise object, and determining the target virtual negative sale warehouse as a prerouting warehouse of the second sub-merchandise object.

In some embodiments, the one or more servers comprise a front-end transaction central server, a logistic central server, and a shipment central server. Before the receiving, by one or more servers, a browse request, the method further comprises: creating a corresponding virtual negative sale warehouse for each physical warehouse, the virtual negative sale warehouse inheriting a coverage region of the corresponding physical warehouse; storing stock information records of merchandise objects that participate in negative sales, the stock information records comprising: physical stock, held physical stock, virtual negative sale stock, and held virtual negative sale stock; using the physical warehouse for prerouting; and when the physical warehouse has no salable physical stock, using the virtual negative sale warehouse for prerouting.

In some embodiments, the method further comprises: determining the transaction order with logistic orders to be generated; determining prerouting information recorded in the transaction order; and if the first sub-merchandise object in the transaction order is routed to the target physical warehouse and the second sub-merchandise object is routed to the virtual negative sale warehouse, generating a first logistic order for the first sub-merchandise, and generating a second logistic order for the second sub-merchandise.

In some embodiments, the method further comprises: upon receiving a shipping request for a logistic order, determining target transaction order information associated with the logistic order; determining whether another logistic order associated with the target transaction order information exists; and if the determination is yes, combining both logistic orders associated with the target transaction order information for processing, wherein, if the prerouting warehouse corresponding to one of the logistic orders is a virtual negative sale warehouse, all sub-merchandises associated with the two logistic orders are packaged together for shipping when detecting that there is a reserved negative sale stock of the sub-merchandise objects associated with the logistic order.

According to another aspect, a system for processing transaction information of a combined merchandise object, comprising one or more processors and a non-transitory computer-readable storage medium storing instructions that, when executed by the processors, cause the system to perform a method. The method comprises: receiving a browse request for browsing detailed information of a combined merchandise object, and acquiring stock information of each sub-merchandise object of the combined merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, providing salable information of the combined merchandise object; and when a request for buying the combined merchandise object is received, generating a transaction order, and upon generation of prerouting information, determining the target physical warehouse as a prerouting warehouse of the first sub-merchandise object, and determining the target virtual negative sale warehouse as a prerouting warehouse of the second sub-merchandise object.

According to another aspect, a method for processing transaction information of a combined merchandise object is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The method comprises: receiving, by a front-end transaction central server, a browse request for browsing detailed information of a combined merchandise object, and acquiring, by the front-end transaction central server, stock information of each sub-merchandise object of the combined merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, providing salable information of the combined merchandise object; and when a request for buying the combined merchandise object is received, generating a transaction order, and upon generation of prerouting information, determining the target physical warehouse as a prerouting warehouse of the first sub-merchandise object, and determining the target virtual negative sale warehouse as a prerouting warehouse of the second sub-merchandise object.

According to another aspect, a method for processing transaction information of a combined merchandise object is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The method comprises: receiving, by a second user client, a browse request for browsing detailed information of a combined merchandise object; submitting the browse request to a front-end transaction platform server, causing the front-end transaction platform server to acquire stock information of each sub-merchandise object of the combined merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, causing the front-end transaction platform server to return salable information of the combined merchandise object; providing the salable information of the combined merchandise object returned by the front-end transaction platform server; and when a request for buying the combined merchandise object is received, submitting the buying request to the front-end transaction platform server, causing the front-end transaction platform server to generate a transaction order, and upon generation of prerouting information, determine the target physical warehouse as a prerouting warehouse of the first sub-merchandise object, and determine the target virtual negative sale warehouse as a prerouting warehouse of the second sub-merchandise object.

According to another aspect, a method for processing logistic information of a combined merchandise object is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The method comprises: determining, by a logistic central server, a target transaction order with logistic orders to be generated; determining prerouting information recorded in the target transaction order; and if a first sub-merchandise object in the target transaction order is routed to the target physical warehouse and a second sub-merchandise object is routed to the virtual negative sale warehouse, generating a first logistic order for the first sub-merchandise, and generating a second logistic order for the second sub-merchandise.

According to another aspect, a method for processing shipping information of a combined merchandise object is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The method comprises: upon receiving a shipping request for a logistic order, determining, by a shipment central server, target transaction order information associated with the logistic order; determining whether another logistic order associated with the target transaction order information exists; and if yes, combining both logistic orders associated with the target transaction order information for processing, wherein, if the prerouting warehouse corresponding to one of the logistic orders is a virtual negative sale warehouse, all sub-merchandises associated with the two logistic orders are packaged together for shipping when detecting that there is a reserved negative sale stock of the sub-merchandise objects associated with the logistic order.

According to another aspect, a device for processing transaction information of a combined merchandise object, implemented in a front-end transaction central server, is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The device comprises: a stock information acquiring unit configured to receive a browse request for browsing detailed information of a combined merchandise object, and acquire stock information of each sub-merchandise object of the combined merchandise object, respectively; a salable information providing unit configured to provide, if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, salable information of the combined merchandise object; and a prerouting unit configured to generate, when a request for buying the combined merchandise object is received, a transaction order, and upon generation of prerouting information, determine the target physical warehouse as a prerouting warehouse of the first sub-merchandise object, and determine the target virtual negative sale warehouse as a prerouting warehouse of the second sub-merchandise object.

According to another aspect, a device for processing transaction information of a combined merchandise object, implemented in a second user client, is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The device comprises: a browse request receiving unit configured to receive a browse request for browsing detailed information of a combined merchandise object; a browse request submitting unit configured to submit the browse request to a front-end transaction platform server, causing the front-end transaction platform server to acquire stock information of each sub-merchandise object of the combined merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, causing the front-end transaction platform server to return salable information of the combined merchandise object; a salable information providing unit configured to provide the salable information of the combined merchandise object returned by the front-end transaction platform server; and a buying request receiving unit configured to submit, when a request for buying the combined merchandise object is received, the buying request to the front-end transaction platform server, causing the front-end transaction platform server to generate a transaction order, and upon generation of prerouting information, determine the target physical warehouse as a prerouting warehouse of the first sub-merchandise object, and determine the target virtual negative sale warehouse as a prerouting warehouse of the second sub-merchandise object.

According to another aspect, a device for processing logistic information of a combined merchandise object, implemented in a logistic central server, is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The device comprises: a target transaction order determining unit configured to determine a target transaction order with logistic orders to be generated; a prerouting information determining unit configured to determine prerouting information recorded in the target transaction order; and a logistic order generating unit configured to generate, if a first sub-merchandise object in the target transaction order is routed to the target physical warehouse and a second sub-merchandise object is routed to the virtual negative sale warehouse, a first logistic order for the first sub-merchandise and a second logistic order for the second sub-merchandise.

According to another aspect, a device for processing shipping information of a combined merchandise object, implemented in a shipment central server, is provided, wherein a corresponding virtual negative sale warehouse is created for a physical warehouse in advance, the virtual negative sale warehouse inherits a coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting.

The device comprises: a target transaction order information determining unit configured to determine, upon receiving a shipping request for a logistic order, target transaction order information associated with the logistic order; a determining unit configured to determine whether another logistic order associated with the target transaction order information exists; and an order combining processing unit configured to combine, if another logistic order associated with the target transaction order information exists, both logistic orders associated with the target transaction order information for processing, wherein, if the prerouting warehouse corresponding to one of the logistic orders is a virtual negative sale warehouse, all sub-merchandises associated with the two logistic orders are packaged together for shipping when detecting that there is a reserved negative sale stock of the sub-merchandise objects associated with the logistic order.

According to the embodiments of the present disclosure, a corresponding virtual negative sale warehouse can be created for a physical warehouse. For both sales of goods in stock and presales of futures, a stock in the virtual negative sale warehouse of a merchandise object can be conveyed to a front-end second user when there is no stock in the physical warehouse, and both sale modes follow the same principle, i.e., the shipping priority of the physical warehouse is higher than the shipping priority of the virtual negative sale warehouse. On the basis of this, a front-end transaction platform server can perform prerouting according to each sub-merchandise object, respectively, for a combined merchandise object, instead of performing prerouting according to the entire combined merchandise object. As such, even when a target physical warehouse has a physical stock of a first sub-merchandise object and no physical stock of a second sub-merchandise object, the combined merchandise object can still be set to a salable state as long as a target virtual negative sale warehouse bundled to the target physical warehouse has a virtual negative sale stock of the second sub-merchandise object, and corresponding salable information can be provided. Then, when a request for buying the combined merchandise object is received, a transaction order can be generated, and upon generation of prerouting information, the target physical warehouse is determined as a prerouting warehouse of the first sub-merchandise object, and the target virtual negative sale warehouse is determined as a prerouting warehouse of the second sub-merchandise object. As such, the combined merchandise object can have more sales opportunities, and moreover, when a second user does not mind waiting for a first user to replenish some sub-merchandises into a warehouse, buying operations of the second user can be made easy, and the second user does not need to wait until all sub-merchandises have the same stock state before a purchase can be made. From an angle of system resources, the number of repeated accesses by the second user can be reduced as the combined merchandise object has more opportunities to be purchased by the second user. Therefore, the provided information is more effective, and the system resources can be conserved.

It is not necessary for any product that implements the present disclosure to simultaneously achieve all of the above advantages.

BRIEF DESCRIPTION OF THE DRAWINGS

To more clearly describe technical solutions in the embodiments of the present disclosure or the prior art, the accompanying drawings required by the embodiments will be briefly described below. Apparently, the accompanying drawings in the following description are merely some embodiments of the present disclosure. To a person skilled in the art, other drawings may be further derived from these accompanying drawings without creative effort.

DETAILED DESCRIPTION

Figure 1:
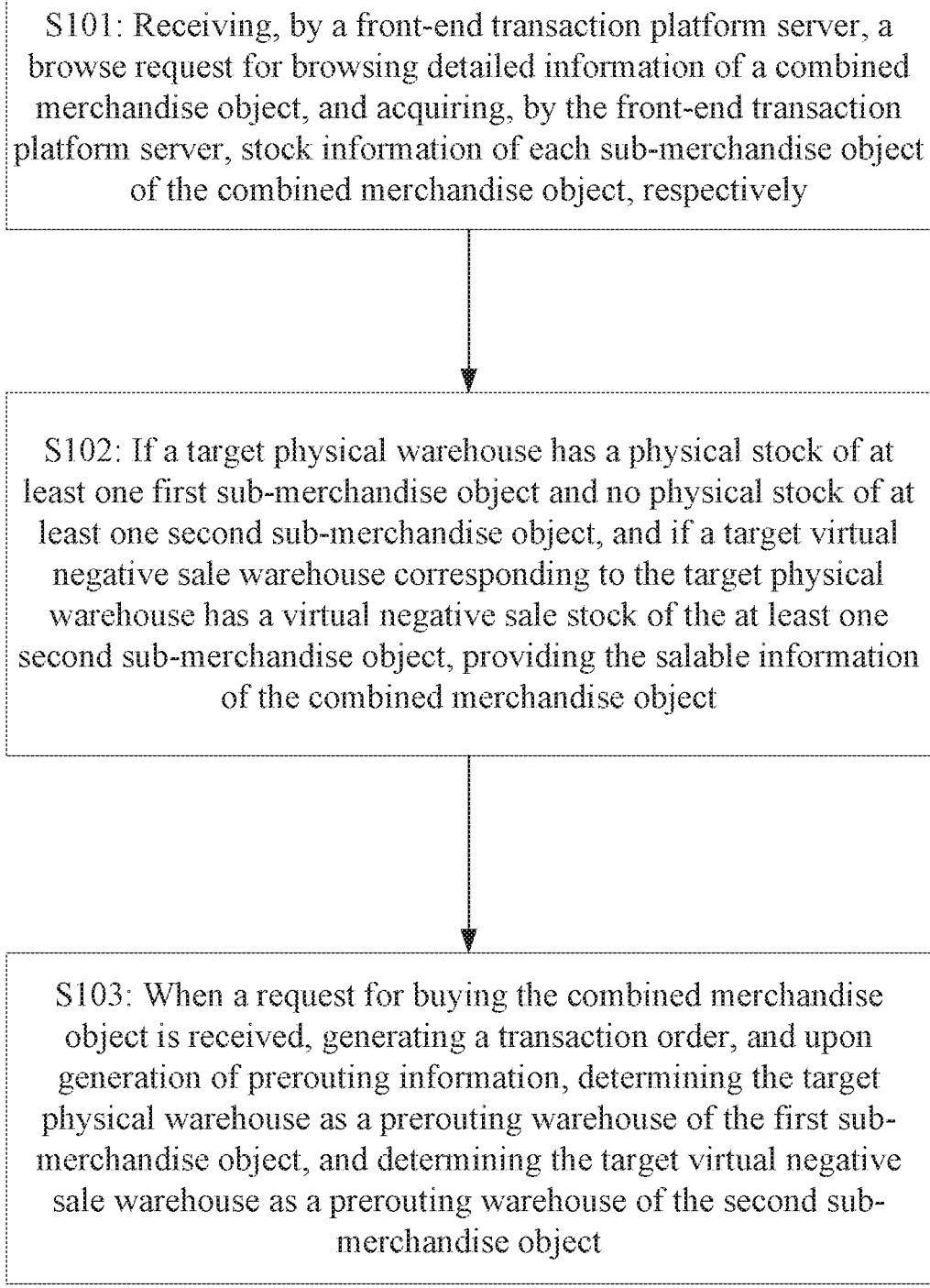
FIG. 1 is a flow chart of a first method according to some embodiments of the present disclosure.

The technical solutions in the embodiments of the present disclosure will be clearly and completely described below with reference to the accompanying drawings in the embodiments of the present disclosure. Apparently, the described embodiments are merely some, not all, embodiments of the present disclosure. All other embodiments derived by a person skilled in the art on the basis of the embodiments of the present disclosure shall be encompassed by the present disclosure.

A concept of "negative sale" is disclosed in some embodiments of the present disclosure. For example, a corresponding virtual negative sale warehouse can be created for each physical warehouse in advance, and each virtual negative sale warehouse inherits the coverage region of the corresponding physical warehouse (it is not necessary to set a delivery time for a virtual negative sale warehouse). For example, information of physical warehouses and virtual warehouses can be maintained in a form shown in Table 1 below.

TABLE 1

| Physical warehouse ID | Name of physical warehouse | Virtual negative sale warehouse ID | Name of virtual negative sale warehouse | Coverage region |
|---|---|---|---|---|
| 20001 | Beijing physical warehouse | 30001 | Beijing virtual negative sale warehouse | Beijing |
| ... | ... | ... | ... | ... |

When a first user (e.g., a business, a seller, etc.) needs to carry out negative sales of a merchandise object, a corresponding virtual negative sale stock can be configured in the corresponding virtual negative sale warehouse. A server can even add a negative sale identifier to the merchandise object, and a stock central server can record the stock in the virtual negative sale warehouse configured by the first user therefor. When a second user (e.g., a buyer and the like) is browsing a webpage of detailed information of the merchandise object, a server can, upon determining that the merchandise object is a negative sale merchandise, perform prerouting in the following manner: first, determining a matching target physical warehouse according to the location of the second user and the coverage regions of physical warehouses associated with the current merchandise object, and then, determining whether the target physical warehouse has a salable physical stock of the merchandise object by querying the stock central server; if yes, displaying the salable physical stock of the merchandise object, and determining the target physical warehouse as a prerouting warehouse; otherwise, if there is no salable physical stock, determining whether the virtual negative sale warehouse bundled to the target physical warehouse has a salable virtual negative sale stock of the merchandise object; if yes, displaying the salable virtual negative sale stock of the merchandise object, and determining the virtual negative sale warehouse as a prerouting warehouse. As such, the merchandise object can be in a salable state even when there is no salable stock of the merchandise object in the physical warehouse, and the second user can place the order normally.

When a second user places an order, a regular transaction order can be generated if the prerouting warehouse is a physical warehouse. If the mode of sales of goods in stock is employed thereafter, the merchandise object can be directly shipped when the second user completes an operation such as making payment. If the mode of presale of future goods is employed, subsequent operations can be executed in a normal procedure. If the prerouting warehouse is a virtual negative sale warehouse, on the other hand, a "negative sale order" can be generated, which will hold a virtual negative sale stock and may further improve other procedures. For example, for a transaction order routed to a virtual negative sale warehouse, the shipping manner may be different from that of orders routed to a physical warehouse when commencing a shipping procedure. In addition, the manner of stock information management, the manner of updating stock after replenishment, and the like may also be different from conventional manners. Prior to an introduction of a shipping procedure for negative sale orders, the differences between stock management in the negative sale mode and conventional manners will be first described below.

In the negative sale mode, stock quantity information in a physical warehouse can be recorded by a "physical stock" object, and stock quantity information in a virtual negative sale warehouse can be recorded by a "virtual negative sale stock" object. Moreover, a "reserved negative sale stock" object can be created to record information of a stock quantity reserved for generated negative sale orders. For example, information regarding the "reserved negative sale stock" can be saved in a warehousing central server. In other words, the stock information of a merchandise object that participates in negative sales can be as shown in Table 2 below:

TABLE 2

| Merchandise object ID | Physical warehouse ID | Physical stock | Held physical stock | Virtual negative sale warehouse ID | Virtual negative sale stock | Held virtual negative sale stock | Reserved negative sale stock |
|---|---|---|---|---|---|---|---|
| 100001 | 20001 | N1 | N2 | 30002 | N3 | N4 | N5 |
| ... | ... | ... | ... | ... | ... | ... | ... |

In some embodiments, to facilitate comparison of pieces of stock information, the form of Table 2 above is employed to describe the stock information. However, the table above is only used to illustratively show various stock information of a merchandise object that participates in negative sales. During an exemplary implementation, information of the fields may not be in the same record, and can even be stored on different servers. For example, physical stock, held physical stock, virtual negative sale stock, and held virtual negative sale stock are stored on a stock central server, while reserved negative sale stock is stored on a warehousing central server, etc.

In an initial state that a merchandise object is configured to be negative sale, the "physical stock" of the merchandise object is determined according to the stock quantity actually in a physical warehouse. The "virtual negative sale stock" is configured by a first user, which is the maximum quantity of the negative sale planned this time, for example, 100 pieces, etc., while the "reserved negative sale stock," held physical stock, and held virtual negative sale stock are all 0. Values of the fields will change subsequently along with generation of regular orders and negative sale orders, as well as the occurrence of stock replenishment by the first user.

For example, when a regular order is generated, the held physical stock can be increased, and when it is a shipment for a regular order, both the physical stock and the held physical stock are deducted. When a negative sale order is generated, the held virtual negative sale stock is increased. When the first user replenishes the merchandise object, the warehousing central server needs to synchronize the stock change information to the stock central server. In the negative sale mode, the rule for synchronous update of stock is different from that of conventional manners. Instead of adding all replenished quantities to the physical stock, it is carried out as follows: first, determining a current quantity of the reserved negative sale stock of the merchandise object (whReserve) and a total quantity of the virtual negative sale stock held by the negative sale orders currently generated for the merchandise object (IPMVOccupy). If IPMVOccupy>whReserve, it proves that the current quantity of the reserved stock cannot meet the demand by negative sale orders that have been generated. Therefore, the quantity of the reserved stock can be increased from the currently replenished stock, and the increased quantity of the reserved stock is IPMVOccupy-whReserve. As such, the increase of the physical stock actually synchronized to the stock center is quantity-(IPMVOccupy-whReserve). When the physical stock is increased, the virtual negative sale stock can further be deducted so as to keep the previously formulated quantity of the negative sale plan unchanged. The deducted quantity is usually identical as the increased quantity of the physical stock. In other words, the total quantity of replenished stock would be divided into two parts in the negative sale mode, one part is added to the reserved negative sale stock, and the other part is added to the physical stock of the warehousing central server.

When shipping is carried out for a negative sale order, the reserved negative sale stock of the merchandise object can be read from the warehousing central server. When the reserved negative sale stock is sufficient, the shipping procedure can be carried out for the negative sale order. When actual shipping is completed, the reserved negative sale stock, held virtual negative sale stock, and virtual negative sale stock are all deducted.

For example, in an initial state that a merchandise object is designated as a merchandise of negative sale, the information of all fields is shown in Table 3:

TABLE 3

| Merchandise object ID | Physical warehouse ID | Physical stock | Held physical stock | Virtual negative sale warehouse ID | Virtual negative sale stock | Held virtual negative sale stock | Reserved negative sale stock |
| --- | --- | --- | --- | --- | --- | --- | --- |
| 100001 | 20001 | 10 | 0 | 30001 | 100 | 0 | 0 |

After a period of front-end sales, all physical stocks are held, and some negative sale orders are generated thereafter. The total quantity of virtual negative sale stocks held by these negative sale orders is 20, and then the information of all fields shown in Table 3 above changes to:

TABLE 4

| Merchandise object id | Physical warehouse ID | Physical stock | Held physical stock | Virtual negative sale warehouse ID | Virtual negative sale stock | Held virtual negative sale stock | Reserved negative sale stock |
| --- | --- | --- | --- | --- | --- | --- | --- |
| 100001 | 20001 | 10 | 10 | 30001 | 100 | 20 | 0 |

At this moment, the salable physical stock is 10−10=0, and the salable virtual negative sale stock is 100−20=80. Assuming that a first user replenishes the merchandise object at this moment, and a total of 50 merchandise objects are replenished to the stock. At this moment, various stock quantities can be updated as follows: first, determining that the difference between the held virtual negative sale stock and the reserved negative sale stock is 20−0=20, and therefore, 20 pieces can be first taken out of the 50 pieces of the replenished stock as the reserved negative sale stock, namely the reserved negative sale stock is increased by 20. Subsequently, 30 pieces of the replenished stock remain, which can be added to the physical stock, such that the salable physical stock changes to (10+30)−10=30. In addition, the virtual negative sale stock can be deducted by 30 pieces, namely the quantity planned for negative sales is transferred to the physical warehouse for sales, and the salable virtual negative sale stock changes to (100−30)−20=50. By the deduction from the virtual negative sale warehouse, the original total quantity planned for negative sales remains unchanged. The updated quantities of the fields are:

TABLE 5

| Merchandise object ID | Physical warehouse ID | Physical stock | Held physical stock | Virtual negative sale warehouse ID | Virtual negative sale stock | Held virtual negative sale stock | Reserved negative sale stock |
|---|---|---|---|---|---|---|---|
| 100001 | 20001 | 40 | 10 | 30001 | 70 | 20 | 20 |

Assuming that all previously generated orders have been shipped subsequently, and that no new transaction orders are generated, then the updated quantities of the fields are:

TABLE 6

| Merchandise object ID | Physical warehouse ID | Physical stock | Held physical stock | Virtual negative sale warehouse ID | Virtual negative sale stock | Held virtual negative sale stock | Reserved negative sale stock |
|---|---|---|---|---|---|---|---|
| 100001 | 20001 | 30 | 0 | 30001 | 50 | 0 | 0 |

In this way, for both sales of goods in stock and presales of futures, a merchandise object can be made salable in a state of no physical stock, such that the sales performance is not affected. Moreover, since all modes of sales follow the same principle, i.e., the shipping priority of a physical warehouse is higher than the priority of a virtual negative sale warehouse. In combination with a strategy that updates quantities of various stocks in processes like subsequent replenishment, no overselling will occur even when a back-end merchandise object is on sale simultaneously in multiple modes of sales at the front end.

On the basis of the above negative sale mode, prerouting can be performed for a combined merchandise object according to sub-merchandises instead of the combined merchandise. As such, when there is a conflict between modes of sales or stock types of sub-merchandise objects, for example, a part of the sub-merchandises has a physical stock in a physical warehouse, while another part of the sub-merchandises does not have physical stocks, it can be determined whether the part of the sub-merchandises with no physical stocks has a virtual negative sale stock in a virtual negative sale warehouse, and whether the virtual negative sale warehouse is bundled to the physical warehouse. If yes, then the combined merchandise object can be set to the salable state. Namely, the combined merchandise object can continue to be on sale as a combined merchandise and in a state that purchase orders can be placed. When a second user places an order to buy the combined merchandise object, different prerouting warehouses can be generated according to actual stocks of sub-merchandises. When a logistic order is subsequently generated, the logistic order can be split into two logistic orders according to different types of the prerouting warehouses. One logistic order is used to track the sub-merchandises with physical stocks, and the other logistic order is used to track the sub-merchandises with no physical stocks but with virtual negative sale stocks. When the merchandise is subsequently shipped, the two logistic orders can be combined. Moreover, shipping can be performed when all sub-merchandises of negative sale have reserved negative sale stocks in the physical warehouse. In other words, in some embodiments, a combined merchandise object can still be sold normally in the form of combined merchandise object even when there is a stock conflict between the sub-merchandises. In an exemplary implementation process, corresponding revisions can be made to processing logics for multiple processes, such as the transaction process, logistic order generation process, and subsequent shipping process. Exemplary implementation processes will be described in detail below.

Various methods described below may be performed by a system (e.g., system 900) for processing transaction information of one or more combined merchandise objects. The system may comprise one or more servers including, for example, a front-end transaction central server (e.g., device 500 described below), a logistic central server (e.g., device 700 described below), and/or a shipment central server (e.g., device 800 described below). The servers may be disposed in the same location or distributed in various locations. The system may comprise one or more processors and a non-transitory computer-readable storage medium storing instructions that, when executed by the processors, cause the system to perform the various methods. Similar to the servers, the processors and the storage medium may be centralized or distributed.

Referring to FIG. 1, the embodiments of the present disclosure provide a method for processing information of a combined merchandise object from the perspective of a front-end transaction platform server (i.e., a server configured to provide a detailed merchandise information page "detail," a buying operation page "buy," and other information). As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when goods are replenished into the warehouse, the replenished stock quantity is first reserved for generated negative sale orders, with the remaining part added to the physical stock. Moreover, the corresponding virtual stock can be deducted to ensure that the total quantity planned for negative sales remains unchanged.

For example, the method may comprise the following steps:

S101: receiving, by a front-end transaction platform server, a browse request for browsing detailed information of a combined merchandise object, and acquiring, by the front-end transaction platform server, stock information of each sub-merchandise object of the combined merchandise object, respectively.

In some embodiments, a combined merchandise is also in the form of a combined merchandise at the time of front-end sales. However, prerouting is performed on sub-merchandises, respectively. In this step, therefore, stock information of each sub-merchandise object can be first acquired, respectively. For example, an identifier, e.g., an ID and the like, of each sub-merchandise object associated with the combined merchandise can be first determined, and then a request for acquiring stock information of each sub-merchandise object is sent to the stock central server. The request can carry the location information of a second user (the location usually just needs to be at a city level in terms of accuracy). Upon receiving the request, the stock central server can determine a target warehouse with a coverage region matching the location of the second user according to coverage regions of warehouses associated with all sub-merchandise objects, then query the stock information of each sub-merchandise object stored in a stock database, and preferentially return physical stocks of sub-merchandise objects. If a sub-merchandise object does not have a physical stock in the target warehouse, a virtual negative sale warehouse corresponding to the target physical warehouse can be determined, and then a virtual negative sale stock of the sub-merchandise object in the virtual negative sale warehouse can be returned.

S102: if the target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, setting the combined merchandise object to a salable state;

Upon receiving the stock information of each sub-merchandise object returned by the stock central server, the transaction platform server can make determinations. If a part of the sub-merchandise objects thereof has a physical stock (for ease of description, this part of the sub-merchandise objects is referred to as the first sub-merchandise object), while another part of the sub-merchandise objects does not have physical stocks, but only has a virtual negative sale stock (this part of the sub-merchandise objects is referred to as the second sub-merchandise object), then the corresponding combined merchandise can still be set to the salable state in some embodiments. For example, a combined merchandise is an air conditioner in front-end sales and corresponds to two sub-merchandise objects at the back end, which are an internal unit and an external unit, respectively. When a buyer in Beijing accesses the page of detailed information of the air conditioner, the front-end transaction platform server can query the stock central server. If the front-end transaction platform server determines that the internal unit of the air conditioner has a physical stock in the Beijing warehouse, but the external unit only has a virtual negative sale stock in a virtual negative sale warehouse associated with the Beijing warehouse. In this case, the air conditioner can still be regarded as salable, and the salable information of the air conditioner can be provided on the page of detailed information.

When the salable information of a combined merchandise object is provided during an exemplary implementation, operation options for executing operations like buying on the page can be set to an operable state. In addition, stock quantity information of the combined merchandise object can be further provided. For example, the stock quantity of each sub-merchandise object can be first determined, and the smallest stock quantity value thereof can be determined to be the salable stock quantity of the combined merchandise object. For example, the internal unit of an air conditioner has 10 pieces in stock in the Beijing warehouse, and the corresponding external unit has 5 pieces in the virtual negative sale warehouse associated with the Beijing warehouse. In this case, the salable stock of the air conditioner can be displayed as 5 pieces. With respect to delivery time, some uncertain factors exist in a series of processes, such as replenishment, shipping, and delivery by a seller, for a part of the sub-merchandise objects only having a stock in a virtual negative sale warehouse to be delivered to an address designated by a second user, and therefore the delivery time may not be displayed at first. However, a business can configure information on its own to prompt the second user. For example, it is prompted that "some sub-merchandises are temporarily out of stock in the physical warehouse and are currently being replenished, nevertheless, they can be purchased first," etc. As such, if willing to wait, the second user can place an order first, without having to always follow the stock arrival information of the merchandise and place an order after the restocking merchandise arrives. In addition, the second user can learn in advance that the stock arrival time may be delayed, which prevents causing poor user experience from an extended wait while the second user is not aware of the situation, etc.

S103: when a request for buying the combined merchandise object is received, generating a transaction order, and upon generation of prerouting information, determining the target physical warehouse as a prerouting warehouse of the first sub-merchandise, and determining the target virtual negative sale warehouse as a prerouting warehouse of the second sub-merchandise.

After the combined merchandise object is set to the salable state, the second user can perform a buying operation thereon. Correspondingly, the transaction platform server can receive a corresponding request and generate a transaction order. Here, when the transaction order is generated, prerouting can be further performed. The prerouting means determining in advance a warehouse to ship from when a transaction order is generated, even before performing shipping delivery. In some embodiments, prerouting can be performed for different sub-merchandise objects, respectively, as they may correspond to different types of warehouses. For example, a target physical warehouse can be determined as a prerouting warehouse of the a sub-merchandise, and a target virtual negative sale warehouse can be determined as a prerouting warehouse of a second sub-merchandise. In other words, there may be two pieces of prerouting information recorded in the same transaction order, one being routed to a physical warehouse and the other one being routed to a virtual negative sale warehouse, and there is a bundling relationship between the physical warehouse and the virtual negative sale warehouse.

When a logistic order is subsequently generated according to the transaction order, the logistic central server can make determinations with respect to the prerouting warehouse information in the transaction order. If there are multiple pieces of prerouting information corresponding to different types of prerouting warehouses, "order splitting" can be performed to generate two logistic orders, namely generating a first logistic order for the first sub-merchandise, and generating a second logistic order for the second sub-merchandise, wherein the first logistic order is used to track shipping, delivery, and other aspects of the first sub-merchandise, and the second logistic order is used to track shipping, delivery, and other aspects of the second sub-merchandise.

The split logistic orders may belong to the same transaction order. As such, when a shipment central server needs to perform shipping, it can combine the first logistic order and the second logistic order associated with the same transaction order. Subsequently, for the logistic order corresponding to the virtual negative sale warehouse, it can be first determined whether the second sub-merchandise has a reserved negative sale stock in the corresponding target physical warehouse. If yes, the first sub-merchandise and the second sub-merchandise can be packaged together for shipping. In other words, although the order is split in the logistic order stage, the orders are combined for processing during shipping as they are associated with the same transaction order, and when all sub-merchandise objects are in a ready-to-ship state, they will be shipped together. As such, the second user will ultimately still receive all sub-merchandises associated with the same combined merchandise. Here, the reserved negative sale stock has been described above. In the negative sale mode, if a merchandise is routed to a virtual negative sale warehouse when a transaction order is generated, the merchandise can be shipped only when a reserved negative sale stock is created; otherwise, one has to wait until next time of replenishment when a new reserved negative sale stock is added. It is the same case when a combined merchandise object is split into multiple logistic orders.

In some embodiments, as a logistic order is split in an exemplary implementation, the second user can further cancel one of the logistic orders. For example, a second user places an order for an air conditioner, wherein the internal unit has a physical stock, while the external unit only has a virtual negative sale warehouse stock. In this case, if the second user does not want to wait for replenishment of the external unit, the second user can negotiate with the first user to cancel the external unit and only have the internal unit shipped. When an agreement is reached through negotiation, the first user can cancel the logistic order corresponding to the external unit. As such, if a shipment central server finds during shipping execution that one of the logistic orders is normal, while the other logistic order has been cancelled, then the shipment central server can only perform shipping processing on the logistic order that has not been cancelled. If the order that has not been cancelled happens to correspond to a sub-merchandise that has a physical stock, then the shipping process can be started directly with no need to wait, such that the second user can receive the sub-merchandise as soon as possible. If neither of the two logistic orders is cancelled, the above order combining process starts, and all sub-merchandises are packaged together for shipping when they are all ready to ship.

In some embodiments, moreover, detailed logistic information of the transaction order can be synchronously updated by tracking the states of the first logistic order and the second logistic order. In other words, one transaction order is split into two logistic orders in some embodiments, and therefore, the statuses of both logistic orders can be tracked. Then, the state of the corresponding transaction order is determined according to the statuses of the two logistic orders. For example, the first logistic order is in a to-be-shipped state, the second logistic order is in an allocated-and-in-transit state, and then the detailed logistic information of the transaction order may not be updated for now. When the second sub-merchandise corresponding to the second logistic order has a reserved negative sale stock, the detailed logistic information of the corresponding transaction order is then updated to a shipped state.

In summary, in some embodiments, a front-end transaction platform server can perform prerouting according to each sub-merchandise object, respectively, for a combined merchandise object, instead of performing prerouting according to the entire combined merchandise object. As such, even when a target physical warehouse has a physical stock of a first sub-merchandise object and no physical stock of a second sub-merchandise object, the combined merchandise object can still be set to a salable state as long as a target virtual negative sale warehouse bundled to the target physical warehouse has a virtual negative sale stock of the second sub-merchandise object, and corresponding salable information can be provided. Then, when a request for buying the combined merchandise object is received, a transaction order can be generated, and upon generation of prerouting information, the target physical warehouse is determined as a prerouting warehouse of the first sub-merchandise object, and the target virtual negative sale warehouse is determined as a prerouting warehouse of the second sub-merchandise object. As such, the combined merchandise object can have more sales opportunities, and moreover, if a second user does not mind waiting for a first user to replenish some sub-merchandises into a warehouse, buying operations of the second user can be made easy, and the second user does not need to wait until all sub-merchandises have the same stock state before a purchase can be made. From the perspective of system resources, the number of repeated accesses by the second user can be reduced as the combined merchandise object has more opportunities to be purchased by the second user. Therefore, the provided information is more effective, and the system resources can be saved.

Figure 2:
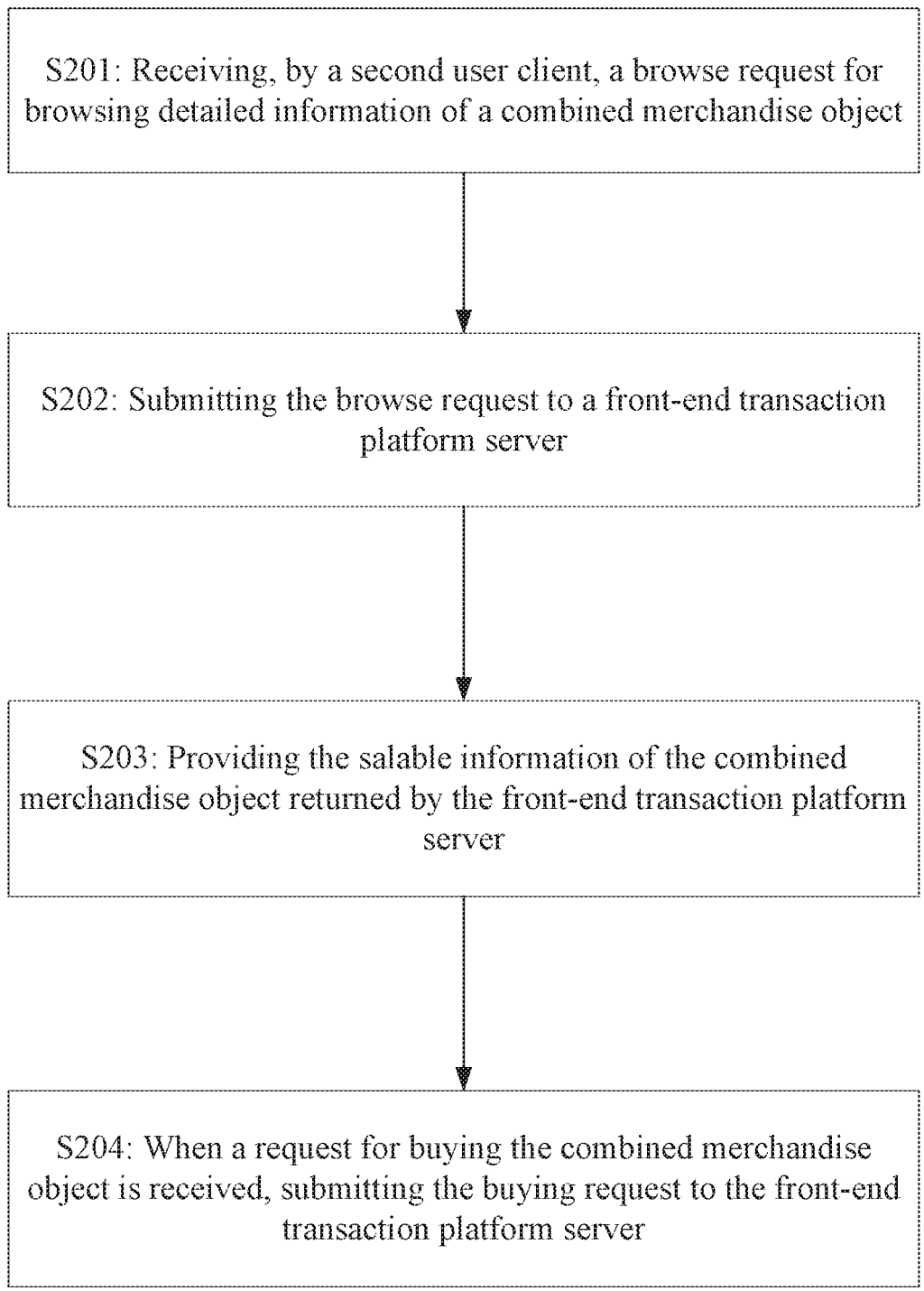
FIG. 2 is a flow chart of a second method according to some embodiments of the present disclosure.

Various embodiments below are described from the perspective of a second user client. Referring to FIG. 2, FIG. 2 provides a method for processing transaction information of a combined merchandise object. As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when a merchandise is replenished into the warehouse, the replenished stock quantity is first reserved for generated negative sale orders, with the remaining part added to the physical stock. Moreover, the corresponding virtual stock can be deducted to ensure that the total quantity planned for negative sales remains unchanged.

For example, the method may comprise the following steps:

S201: receiving, by a second user client, a browse request for browsing detailed information of a combined merchandise object;

S202: submitting the browse request to a front-end transaction platform server, causing the front-end transaction platform server to acquire stock information of each sub-merchandise object, respectively. If a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, causing the front-end transaction platform server to return salable information of the combined merchandise object;

S203: providing the salable information of the combined merchandise object returned by the front-end transaction platform server;

S204: when a request for buying the combined merchandise object is received, submitting the buying request to the front-end transaction platform server, causing the front-end transaction platform server to generate a transaction order, and upon generation of prerouting information, determine the target physical warehouse as a prerouting warehouse of the first sub-merchandise object, and determine the target virtual negative sale warehouse as a prerouting warehouse of the second sub-merchandise object.

Figure 3:
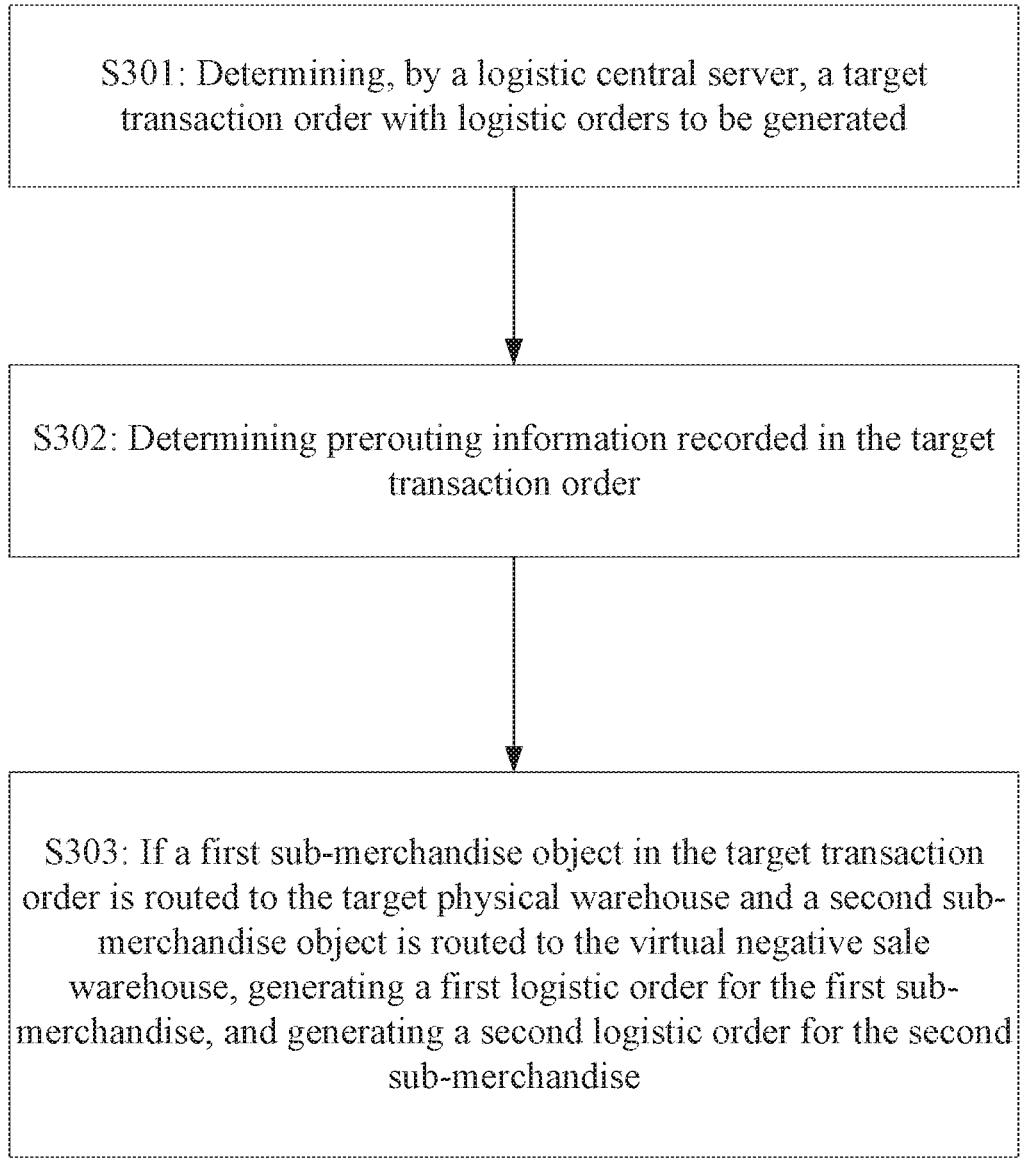
FIG. 3 is a flow chart of a third method according to some embodiments of the present disclosure.

Various embodiments below are described from the perspective of a logistic central server. Referring to FIG. 3, FIG. 3 provides a method for processing logistic information of a combined merchandise object. As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when a merchandise is replenished into the warehouse, the replenished stock quantity is first reserved for generated negative sale orders, with the remaining part added to the physical stock. Moreover, the corresponding virtual stock can be deducted to ensure that the total quantity planned for negative sales remains unchanged.

For example, the method may comprise the following steps:

S301: determining, by a logistic central server, a target transaction order with logistic orders to be generated;

S302: determining prerouting information recorded in the target transaction order;

S303: if a first sub-merchandise object in the target transaction order is routed to the target physical warehouse and a second sub-merchandise object is routed to the virtual negative sale warehouse, generating a first logistic order for the first sub-merchandise, and generating a second logistic order for the second sub-merchandise.

In an exemplary implementation, the logistic central server can further synchronously update detailed logistic information of the transaction order by tracking the states of the first logistic order and the second logistic order.

Figure 4:
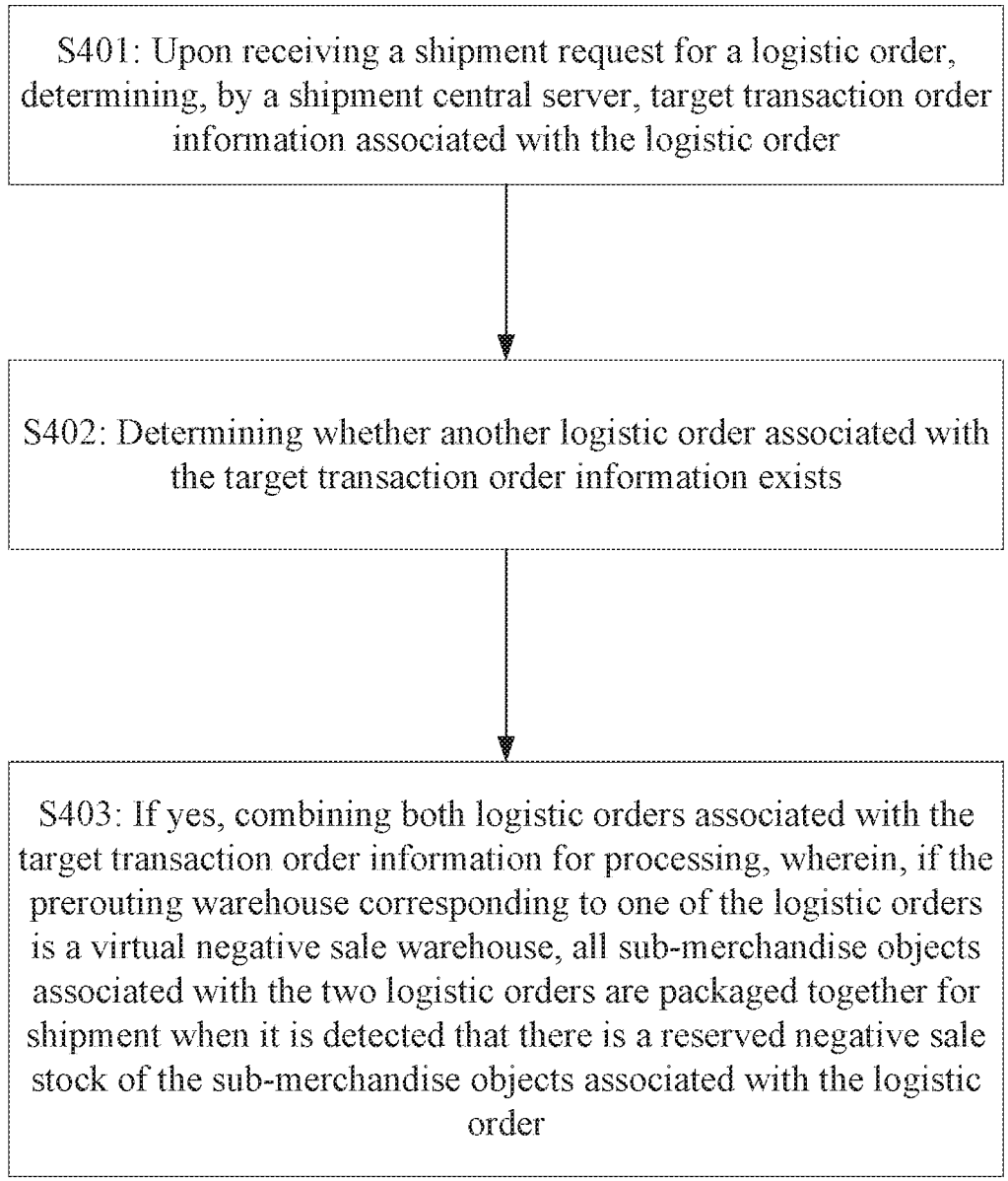
FIG. 4 is a flow chart of a fourth method according to some embodiments of the present disclosure.

Various embodiments below are described from the perspective of a shipment central server. Referring to FIG. 4, FIG. 4 provides a method for processing shipping information of a combined merchandise object. As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when a merchandise is replenished into the warehouse, the replenished stock quantity is first reserved for generated negative sale orders, with the remaining part added to the physical stock.

Moreover, the corresponding virtual stock can be deducted to ensure that the total quantity planned for negative sales remains unchanged.

For example, the method may comprise the following steps:

S401: upon receiving a shipping request for a logistic order, determining, by a shipment central server, target transaction order information associated with the logistic order;

S402: determining whether another logistic order associated with the target transaction order information exists;

S403: if yes, combining both logistic orders associated with the target transaction order information for processing, wherein, if the prerouting warehouse corresponding to one of the logistic orders is a virtual negative sale warehouse, all sub-merchandise objects associated with the two logistic orders are packaged together for shipping when detecting that there is a reserved negative sale stock of the sub-merchandise objects associated with the logistic order.

In an exemplary implementation, after determining logistic orders associated with the same transaction order, the shipment central server can first determine the state of each logistic order. If none of the logistic orders is cancelled, the shipment central server is triggered to execute the order combining operation. If one of the logistic orders is cancelled, the shipping operation can be executed only based on the uncancelled logistic order.

Figure 5:
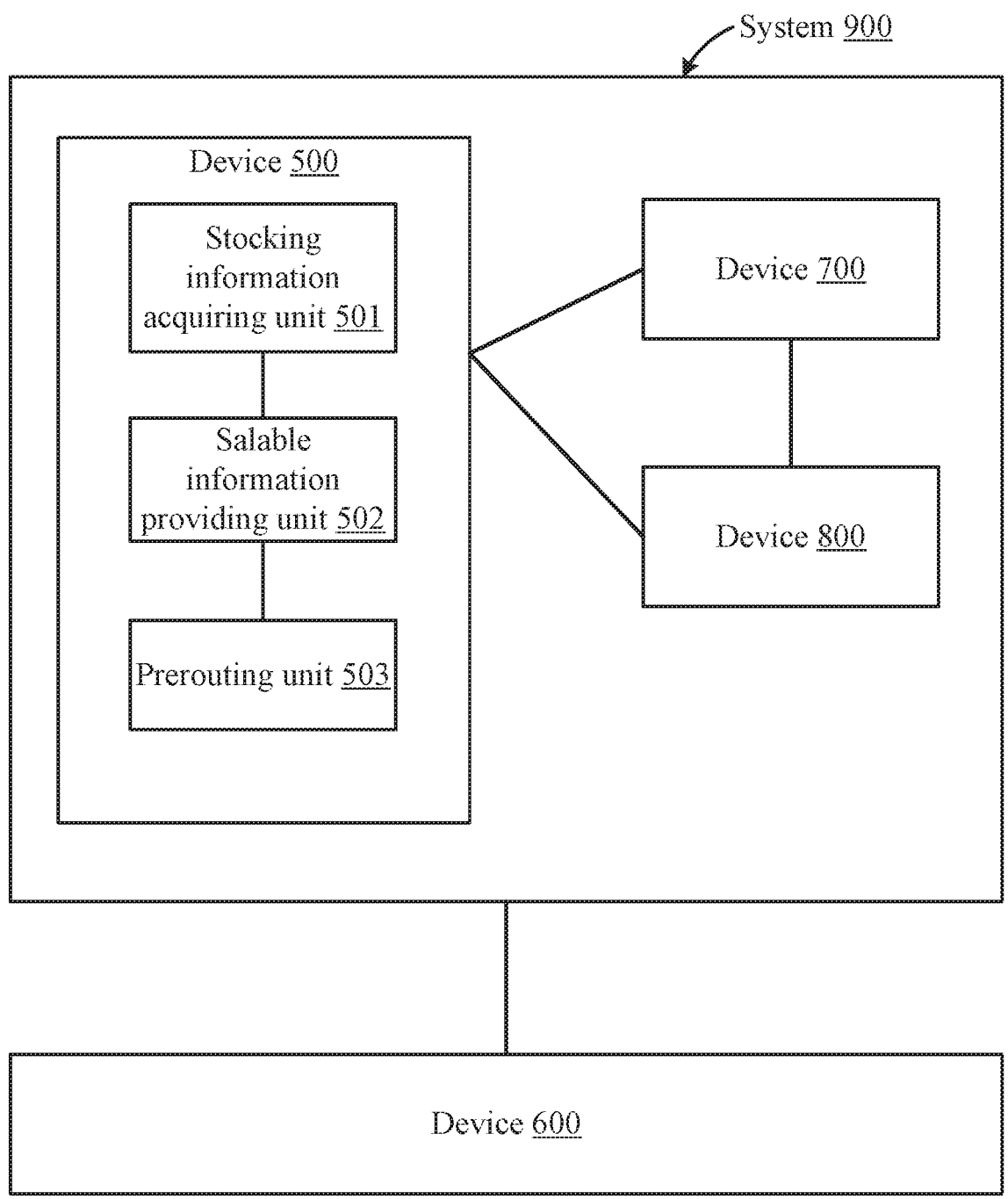
FIG. 5 is a schematic diagram of a first device according to some embodiments of the present disclosure.

Corresponding to FIG. 1, FIG. 3, and FIG. 4 described above, the embodiments of the present disclosure further provide a system 900 for processing transaction information of a combined merchandise object as shown in FIG. 5. In some embodiments, the system 900 for processing transaction information of one or more combined merchandise objects may comprise a device 500, a device 700, and a device 800 coupled to one another through various communication channels (e.g., network) and described in more details below. The system 900 may communicate with one or more devices (e.g., device 600 which is also described in more details below). In some embodiments, the devices 500, 700, and 800 may be implemented as one or more servers. The one or more servers may comprise a front-end transaction central server, a logistic central server, and a shipment central server.

In some embodiments, the system 900 may comprise one or more processors and a non-transitory computer-readable storage medium storing instructions that, when executed by the processors, cause the system to perform a method. The method comprises: receiving a browse request for browsing detailed information of a combined merchandise object, and acquiring stock information of each sub-merchandise object of the combined merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, providing salable information of the combined merchandise object; and when a request for buying the combined merchandise object is received, generating a transaction order, and upon generation of prerouting information, determining the target physical warehouse as a prerouting warehouse of the first sub-merchandise object, and determining the target virtual negative sale warehouse as a prerouting warehouse of the second sub-merchandise object.

In some embodiments, before the receiving, by one or more servers, a browse request, the method further comprises: creating a corresponding virtual negative sale warehouse for each physical warehouse, the virtual negative sale warehouse inheriting a coverage region of the corresponding physical warehouse; storing stock information records of merchandise objects that participate in negative sales, the stock information records comprising: physical stock, held physical stock, virtual negative sale stock, and held virtual negative sale stock; using the physical warehouse for prerouting; and when the physical warehouse has no salable physical stock, using the virtual negative sale warehouse for prerouting.

Corresponding to FIG. 1 described above, the embodiments of the present disclosure further provide a device for processing transaction information of a combined merchandise object, which is implementable in a front-end transaction central server. As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when a merchandise is replenished into the warehouse, the replenished stock quantity is first reserved for generated negative sale orders, with the remaining part added to the physical stock. Moreover, the corresponding virtual stock can be deducted to ensure that the total quantity planned for negative sales remains unchanged.

For example, referring to FIG. 5, the device 500 may comprise:

a stock information acquiring unit 501 configured to receive a browse request for browsing detailed information of a combined merchandise object, and acquire stock information of each sub-merchandise object, respectively;

a salable information providing unit 502 configured to provide, if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, salable information of the combined merchandise object;

a prerouting unit 503 configured to generate, when a request for buying the combined merchandise object is received, a transaction order, and upon generation of prerouting information, determine the target physical warehouse as a prerouting warehouse of the first sub-merchandise object, and determine the target virtual negative sale warehouse as a prerouting warehouse of the second sub-merchandise object.

In some embodiments, the various units of the device 500 may be implemented as software instructions. That is, the device 500 may comprise a processor and a non-transitory computer-readable storage medium storing instructions that, when executed by the processor, cause the device to performed various steps and methods of the units 501, 502, and 503 described above.

In some embodiments, the salable information of the combined merchandise object comprises salable stock quantity information of the combined merchandise object, and the salable information providing unit comprises a salable stock quantity determining subunit configured to determine stock quantity of each sub-merchandise object, and determine a minimum value of the determined stock quantities to be the salable stock quantity of the combined merchandise object. In one embodiment, the salable information of the combined merchandise object may not comprise delivery time information.

In an exemplary implementation, when generating logistic orders associated with the transaction order, the logistic central server generates, according to different types of prerouting warehouses, a first logistic order for the first sub-merchandise and a second logistic order for the second sub-merchandise.

For shipping based on the logistic orders, a shipment central server combines the first logistic order and the second logistic order associated with the same transaction order, and packages the first sub-merchandise and the second sub-merchandise for shipping when detecting that there is a reserved negative sale stock of the second sub-merchandise in the corresponding target physical warehouse.

Corresponding to FIG. 2 described above, the embodiments of the present disclosure further provide a device for processing transaction information of a combined merchandise object, which is implementable in a second user client. As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when a merchandise is replenished into the warehouse, the replenished stock quantity is first reserved for generated negative sale orders, with the remaining part added to the physical stock. Moreover, the corresponding virtual stock can be deducted to ensure that the total quantity planned for negative sales remains unchanged.

Figure 6:
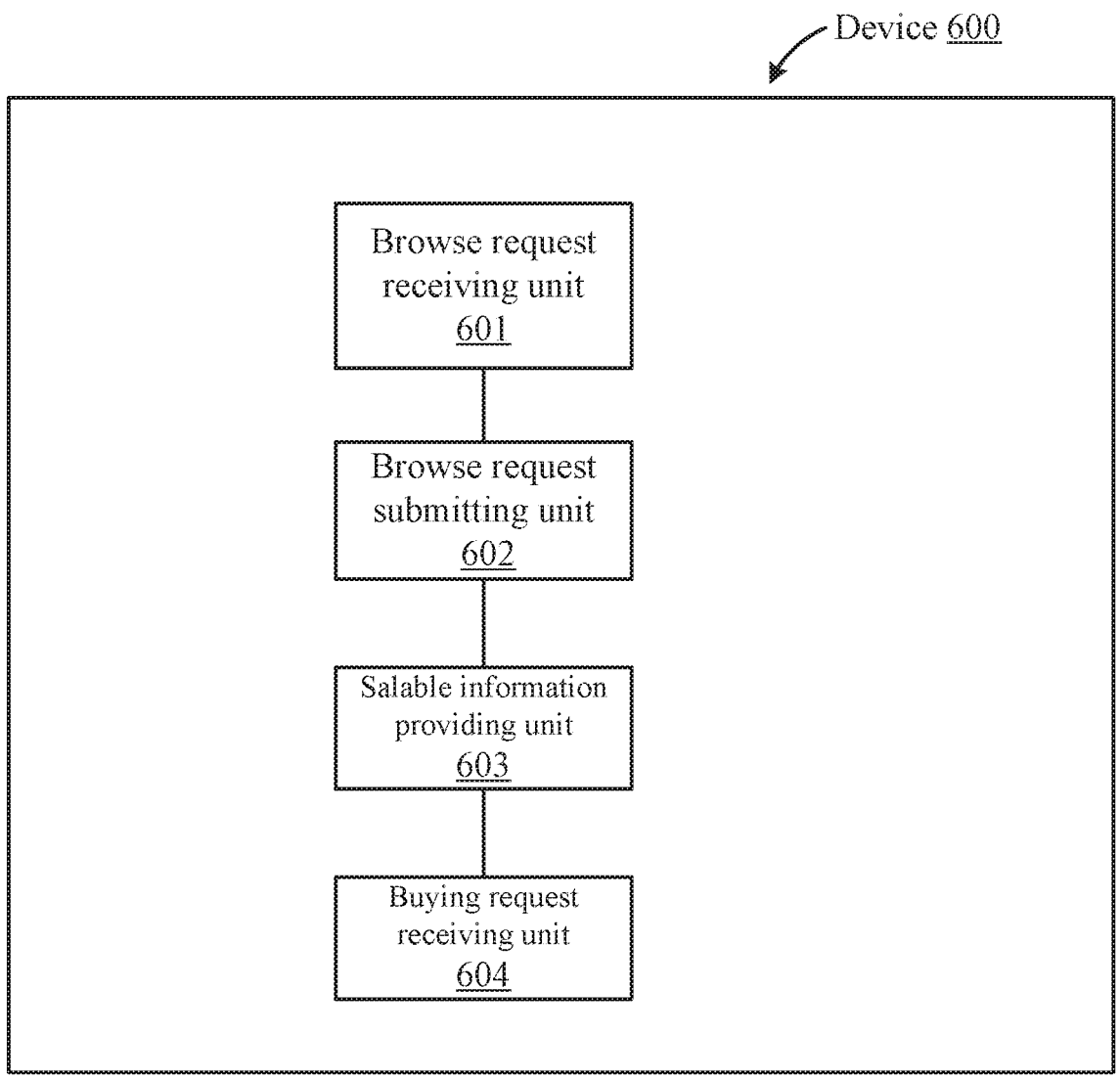
FIG. 6 is a schematic diagram of a second device according to some embodiments of the present disclosure.

For example, referring to FIG. 6, the device 600 may comprise:

a browse request receiving unit 601 configured to receive a browse request for browsing detailed information of a combined merchandise object;

a browse request submitting unit 602 configured to submit the browse request to a front-end transaction platform server, causing the front-end transaction platform server to acquire stock information of each sub-merchandise object, respectively; if a target physical warehouse has a physical stock of at least one first sub-merchandise object and no physical stock of at least one second sub-merchandise object, and if a target virtual negative sale warehouse corresponding to the target physical warehouse has a virtual negative sale stock of the at least one second sub-merchandise object, causing the front-end transaction platform server to return salable information of the combined merchandise object;

a salable information providing unit 603 configured to provide the salable information of the combined merchandise object returned by the front-end transaction platform server;

a buying request receiving unit 604 configured to submit, when a request for buying the combined merchandise object is received, the buying request to the front-end transaction platform server, causing the front-end transaction platform server to generate a transaction order, and upon generation of prerouting information, determine the target physical warehouse as a prerouting warehouse of the first sub-merchandise object, and determine the target virtual negative sale warehouse as a prerouting warehouse of the second sub-merchandise object.

In some embodiments, the various units of the device 600 may be implemented as software instructions. That is, the device 600 may comprise a processor and a non-transitory computer-readable storage medium storing instructions that, when executed by the processor, cause the device to performed various steps and methods of the units 601, 602, 603, and 604 described above.

Corresponding to FIG. 3 described above, the embodiments of the present disclosure further provide a device for processing logistic information of a combined merchandise object, which is implementable in a logistic central client. As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when a merchandise is replenished into the warehouse, the replenished stock quantity is first reserved for generated negative sale orders, with the remaining part added to the physical stock. Moreover, the corresponding virtual stock can be deducted to ensure that the total quantity planned for negative sales remains unchanged.

Figure 7:
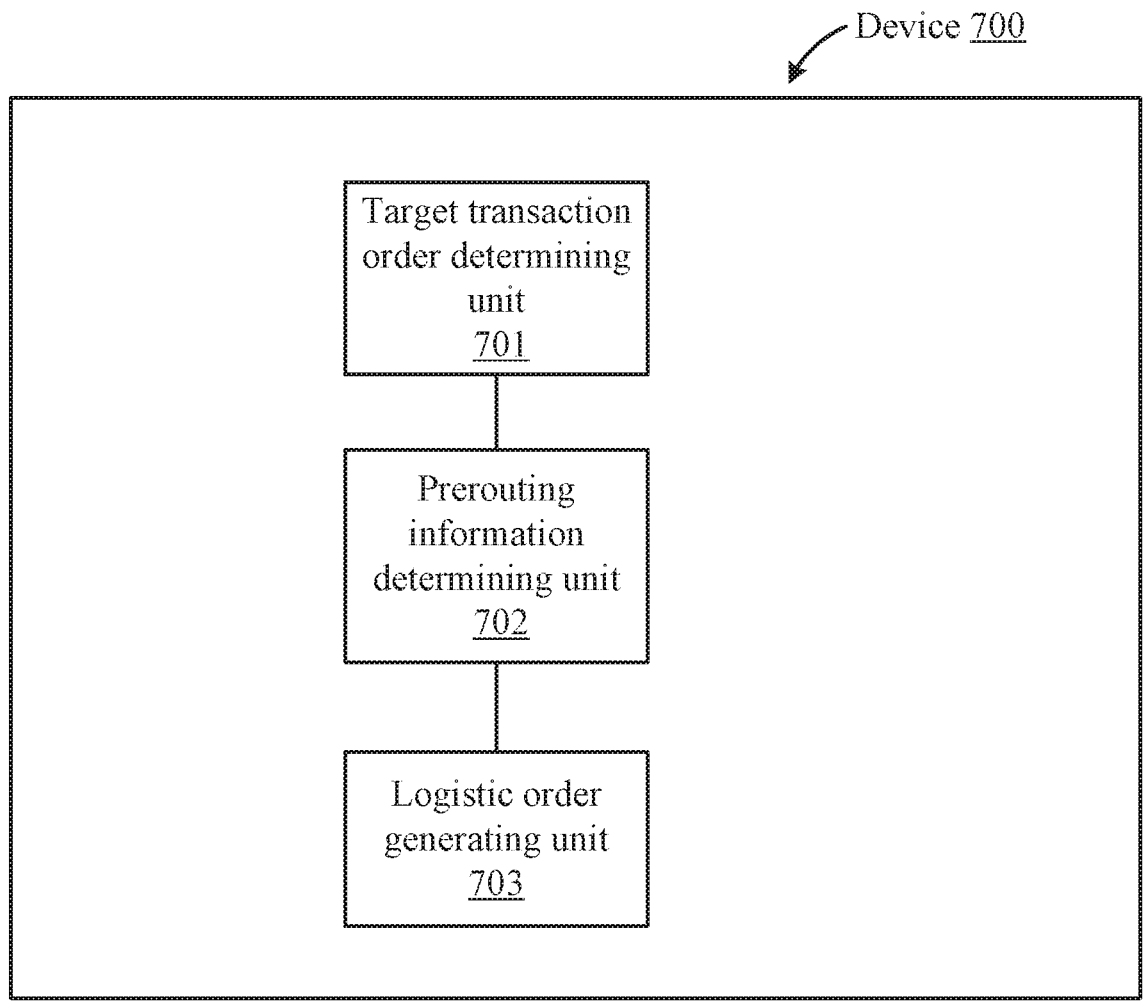
FIG. 7 is a schematic diagram of a third device according to some embodiments of the present disclosure.

For example, referring to FIG. 7, the device 700 may comprise:

a target transaction order determining unit 701 configured to determine a target transaction order with logistic orders to be generated;

a prerouting information determining unit 702 configured to determine prerouting information recorded in the target transaction order;

a logistic order generating unit 703 configured to generate, if a first sub-merchandise object in the target transaction order is routed to the target physical warehouse and a second sub-merchandise object is routed to the virtual negative sale warehouse, a first logistic order for the first sub-merchandise and a second logistic order for the second sub-merchandise.

In some embodiments, the various units of the device 700 may be implemented as software instructions. That is, the device 700 may comprise a processor and a non-transitory computer-readable storage medium storing instructions that, when executed by the processor, cause the device to performed various steps and methods of the units 701, 702, and 703 described above.

In an exemplary implementation, the device can further comprise: a tracking unit configured to synchronously update detailed logistic information of the transaction order by tracking the states of the first logistic order and the second logistic order.

Corresponding to FIG. 4 described above, the embodiments of the present disclosure further provide a device for processing shipping information of a combined merchandise object, which is implementable in a shipment central client. As described above, according to the method, a corresponding virtual negative sale warehouse can be created for each physical warehouse in advance, the virtual negative sale warehouse inherits the coverage region of the corresponding physical warehouse, a stock central server stores stock information records of merchandise objects that participate in negative sales, and the stock information records comprise: physical stock, held physical stock, virtual negative sale stock, and held virtual negative sale stock; a front-end sale platform server preferentially uses the physical warehouse for prerouting, and when there is no salable physical stock, the front-end sale platform server uses the virtual negative sale warehouse for prerouting; in addition, a warehousing central server can store reserved negative sale stock records of merchandise objects that participate in negative sales, and when a merchandise is replenished into the warehouse, the replenished stock quantity is first reserved for generated negative sale orders, with the remaining part added to the physical stock. Moreover, the corresponding virtual stock can be deducted to ensure that the total quantity planned for negative sales remains unchanged.

Figure 8:
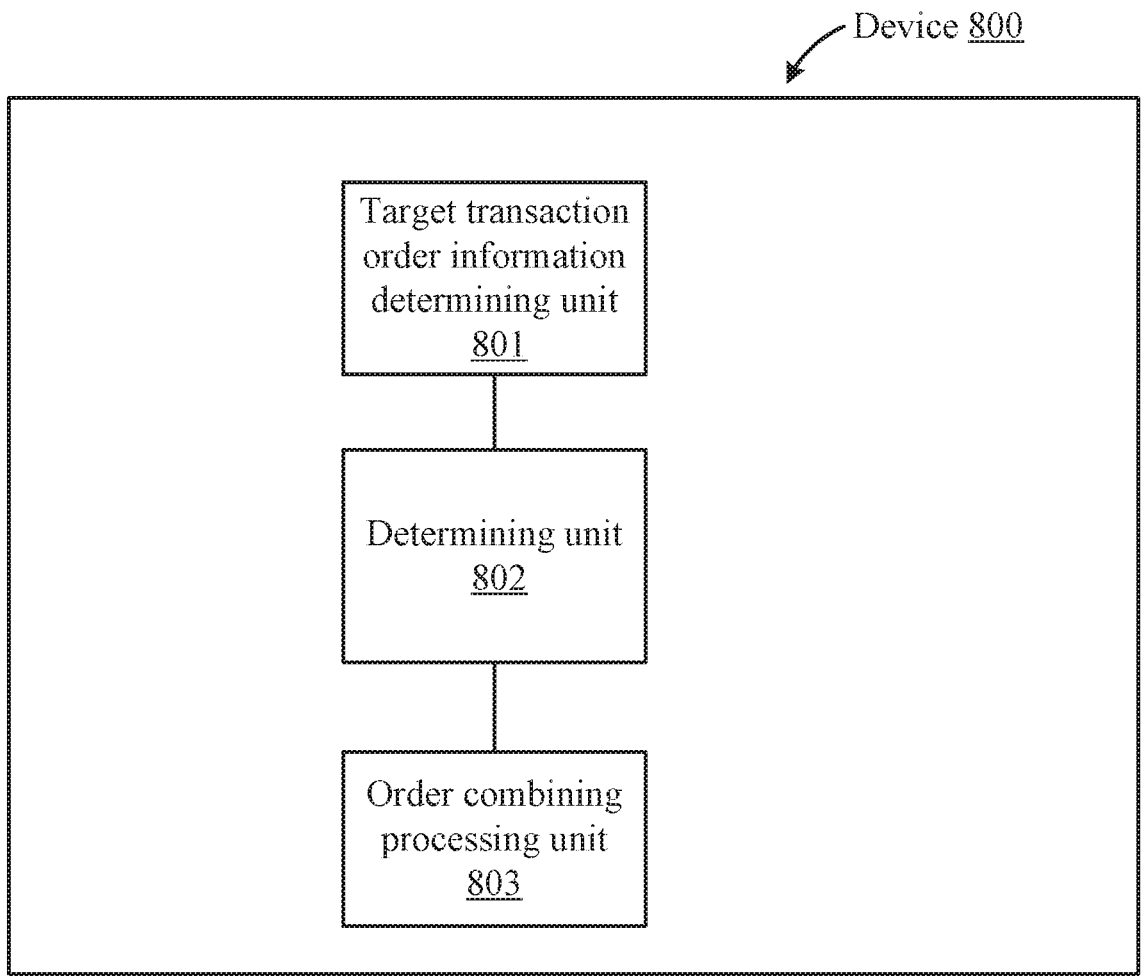
FIG. 8 is a schematic diagram of a fourth device according to some embodiments of the present disclosure.

For example, referring to FIG. 8, the device 800 may comprise:

a target transaction order information determining unit 801 configured to determine, upon receiving a shipping request for a specified logistic order, target transaction order information associated with the specified logistic order;

a determining unit 802 configured to determine whether another logistic order associated with the target transaction order information exists;

an order combining processing unit 803 configured to combine, if another logistic order associated with the target transaction order information exists, both logistic orders associated with the target transaction order information for processing, wherein, if the prerouting warehouse corresponding to one of the logistic orders is a virtual negative sale warehouse, all sub-merchandises associated with the two logistic orders are packaged together for shipping when detecting that there is a reserved negative sale stock of the sub-merchandise objects associated with the logistic order.

In some embodiments, the various units of the device 800 may be implemented as software instructions. That is, the device 800 may comprise a processor and a non-transitory computer-readable storage medium storing instructions that, when executed by the processor, cause the device to performed various steps and methods of the units 801, 802, and 803 described above.

In an exemplary implementation, the device can further comprise:

a logistic order state determining unit configured to determine, after determining logistic orders associated with the same transaction order, the state of each logistic order;

a triggering unit configured to trigger, if none of the logistic orders is cancelled, to execute the order combining operation.

a shipment unit configured to execute, if one of the logistic orders is cancelled, the shipping operation only based on the uncancelled logistic order.

In some embodiments of the present disclosure, a front-end transaction platform server can perform prerouting according to each sub-merchandise object, respectively, for a combined merchandise object, instead of performing prerouting according to the entire combined merchandise object. As such, even when a target physical warehouse has a physical stock of a first sub-merchandise object and no physical stock of a second sub-merchandise object, the combined merchandise object can still be set to a salable state as long as a target virtual negative sale warehouse bundled to the target physical warehouse has a virtual negative sale stock of the second sub-merchandise object, and corresponding salable information can be provided. Then, when a request for buying the combined merchandise object is received, a transaction order can be generated, and upon generation of prerouting information, the target physical warehouse is determined as a prerouting warehouse of the first sub-merchandise object, and the target virtual negative sale warehouse is determined as a prerouting warehouse of the second sub-merchandise object. As such, the combined merchandise object can have more sales opportunities, and moreover, when a second user does not mind waiting for a first user to replenish some sub-merchandises into a warehouse, buying operations of the second user can be made easy, and the second user does not need to wait until all sub-merchandises have the same stock state before a purchase can be made. From a perspective of system resources, the number of repeated accesses by the second user can be reduced as the combined merchandise object has more opportunities to be purchased by the second user. Therefore, the provided information is more effective, and the system resources can be saved.

According to the description of the above manners of implementation, therefore, a person skilled in the art can clearly understand that the present application can be implemented by means of software plus a necessary general hardware platform. On the basis of such an understanding, the technical solution of the present disclosure can be embodied, in essence or with respect to the part contributing to the prior art, in the form of a software product. The computer software product can be stored in a storage medium, such as ROM/RAM, magnetic disc, optical disc, and the like, and may comprise a number of instructions to enable a computer device (which may be a personal computer, a server, or a network device) to carry out the methods set forth in the embodiments or some parts of the embodiments of the present disclosure.

The embodiments in this specification are described in a progressive manner with each embodiment focused on differences from other embodiments, and the embodiments may be mutually referenced for identical or similar parts thereof. For the system or the system embodiment, in particular, the description thereof is relatively simple as it is substantially similar to the method embodiment. The description of the method embodiment may be referenced for related parts thereof. The system or the system embodiment described above is merely illustrative, wherein the units described as discrete parts may or may not be physically separated, and the parts displayed as units may or may not be physical units. Namely, they can be located at one place, or distributed over a plurality of network units. Some or all modules thereof can be selected according to actual needs to achieve the objectives of the solutions of the embodiments, which can be understood and implemented by a person skilled in the art without creative effort.

The methods and devices for processing transaction information of a combined merchandise object provided by the present disclosure are described in detail above. Specific examples are used herein to describe the principle and implementation manner of the present disclosure, and the description of the embodiments above is merely used to help understand the methods and core concepts of the present disclosure; to a person skilled in the art, meanwhile, changes can be made to the specific implementation manner and application scope according to the concept of the present disclosure. In summary, the content of the specification shall not be construed as limitations to the present disclosure.

What is claimed is:

1. A method for processing transaction information of a combined merchandise object, comprising:
   receiving, by one or more servers, a browse request for browsing detailed information of the combined merchandise object comprising a first sub-merchandise object and a second sub-merchandise object that are to be sold together as the combined merchandise object, and acquiring, by the one or more servers, stock information of each of the first sub-merchandise object and the second sub-merchandise object;
   in response to determining, by the one or more servers, that a target physical warehouse has a physical stock of the first sub-merchandise object and no physical stock of the second sub-merchandise object, determining, by the one or more servers, whether a target virtual negative sale warehouse corresponding to the target physical warehouse has a virtual negative sale stock of the second sub-merchandise object;
   in response to determining that the target virtual negative sale warehouse corresponding to the target physical warehouse has a virtual negative sale stock of the second sub-merchandise object, providing, by the one or more servers, salable information of the combined merchandise object;
   in response to that a request for buying the combined merchandise object is received, generating, by the one or more servers, a transaction order; and
   generating, by the one or more servers, prerouting information for routing the combined merchandise object, the prerouting information indicating that the target physical warehouse is a prerouting warehouse of the first sub-merchandise object, and that the target virtual negative sale warehouse is a prerouting warehouse of the second sub-merchandise object.

2. The method according to claim 1, wherein:
   the one or more servers comprise a front-end transaction central server, a logistic central server, and a shipment central server; and
   before the receiving, by one or more servers, a browse request, the method further comprises:
      creating a corresponding virtual negative sale warehouse for each physical warehouse, the virtual negative sale warehouse inheriting a coverage region of the corresponding physical warehouse;
      storing stock information records of merchandise objects that participate in negative sales, the stock information records comprising: physical stock, held physical stock, virtual negative sale stock, and held virtual negative sale stock;
      using the physical warehouse for prerouting; and
      when the physical warehouse has no salable physical stock, using the virtual negative sale warehouse for prerouting.

3. The method according to claim 1, wherein the salable information of the combined merchandise object comprises salable stock quantity information of the combined merchandise object, and the salable stock quantity information of the combined merchandise object is determined by:
   determining a stock quantity of each of the first sub-merchandise object and the second sub-merchandise object, and determining a minimum value of the determined stock quantities of the first sub-merchandise object and the second sub-merchandise object to be the salable stock quantity of the combined merchandise object.

4. The method according to claim 1, further comprising:
   generating logistic orders associated with the transaction order by generating a first logistic order for the first sub-merchandise object and a second logistic order for the second sub-merchandise object according to different types of prerouting warehouses.

5. The method according to claim 4, further comprising:
   shipping the combined merchandise object based on the logistic orders, the shipping comprising:
   combining the first logistic order and the second logistic order associated with the transaction order, and
   packaging the first sub-merchandise object and the second sub-merchandise object for shipping when detecting that there is a reserved negative sale stock of the second sub-merchandise object in the target physical warehouse.

6. The method according to claim 1, further comprising:
   determining the transaction order for to-be-generated logistic orders associated with the combined merchandise object;
   determining the prerouting information recorded in the transaction order; and
   in response to that the first sub-merchandise object in the transaction order is routed to the target physical warehouse and the second sub-merchandise object is routed to the virtual negative sale warehouse, generating a first logistic order for the first sub-merchandise object, and generating a second logistic order for the second sub-merchandise object.

7. The method according to claim 6, further comprising:
   synchronously updating logistic information of the transaction order by tracking states of the first logistic order and the second logistic order.

8. The method according to claim 7, further comprising:
   in response to the states of the first logistic order and the second logistic order indicating that none of the first logistic order and the second logistic order is cancelled, combining the first logistic order and the second logistic order associated with the transaction order; and
   executing, in response to the states of the first logistic order and the second logistic order indicating that one of the first logistic order and the second logistic order is cancelled, a shipping operation only based on the uncancelled logistic order.

9. A system for processing transaction information of a combined merchandise object, comprising one or more processors and a non-transitory computer-readable storage medium storing instructions that, when executed by the one or more processors, cause the one or more processors to perform operations comprising:
   receiving a browse request for browsing detailed information of the combined merchandise object comprising a first sub-merchandise object and a second sub-merchandise object that are to be sold together as the combined merchandise object, and acquiring stock information of each of the first sub-merchandise object and the second sub-merchandise object;

in response to determining, by the one or more servers, that a target physical warehouse has a physical stock of the first sub-merchandise object and no physical stock of the second sub-merchandise object, determining, by the one or more servers, whether a target virtual negative sale warehouse corresponding to the target physical warehouse has a virtual negative sale stock of the second sub-merchandise object;

in response to determining that the target virtual negative sale warehouse corresponding to the target physical warehouse has a virtual negative sale stock of the second sub-merchandise object, providing, by the one or more servers, salable information of the combined merchandise object;

in response to that a request for buying the combined merchandise object is received, generating, by the one or more servers, a transaction order; and generating, by the one or more servers, prerouting information for routing the combined merchandise object, the prerouting information indicating that the target physical warehouse is a prerouting warehouse of the first sub-merchandise object, and that the target virtual negative sale warehouse is a prerouting warehouse of the second sub-merchandise object.

10. The system according to claim 9, wherein, before the receiving a browse request, the instructions further cause the one or more processors to perform:

creating a corresponding virtual negative sale warehouse for each physical warehouse, the virtual negative sale warehouse inheriting a coverage region of the corresponding physical warehouse;

storing stock information records of merchandise objects that participate in negative sales, the stock information records comprising: physical stock, held physical stock, virtual negative sale stock, and held virtual negative sale stock;

using the physical warehouse for prerouting; and when the physical warehouse has no salable physical stock, using the virtual negative sale warehouse for prerouting.

11. The system according to claim 9, wherein the salable information of the combined merchandise object comprises salable stock quantity information of the combined merchandise object, and the salable stock quantity information of the combined merchandise object is determined by:

determining a stock quantity of each of the first sub-merchandise object and the second sub-merchandise object, and determining a minimum value of the determined stock quantities of the first sub-merchandise object and the second sub-merchandise object to be the salable stock quantity of the combined merchandise object.

12. The system according to claim 9, wherein the operations further comprise:

generating logistic orders associated with the transaction order by generating a first logistic order for the first sub-merchandise object and a second logistic order for the second sub-merchandise object according to different types of prerouting warehouses.

13. The system according to claim 12, wherein the operations further comprise:

shipping the combined merchandise object based on the logistic orders, the shipping comprising:

combining the first logistic order and the second logistic order associated with the transaction order, and packaging the first sub-merchandise object and the second sub-merchandise object for shipping when detecting that there is a reserved negative sale stock of the second sub-merchandise object in the target physical warehouse.

14. The system according to claim 9, wherein the operations further comprise:

determining the transaction order for to-be-generated logistic orders associated with the combined merchandise object;

determining the prerouting information recorded in the transaction order; and in response to that the first sub-merchandise object in the transaction order is routed to the target physical warehouse and the second sub-merchandise object is routed to the virtual negative sale warehouse, generating a first logistic order for the first sub-merchandise object, and generating a second logistic order for the second sub-merchandise object.

15. The system according to claim 14, wherein the operations further comprise:

synchronously updating logistic information of the transaction order by tracking states of the first logistic order and the second logistic order.

16. The system according to claim 15, wherein the operations further comprise:

in response to the states of the first logistic order and the second logistic order indicating that none of the first logistic order and the second logistic order is cancelled, combining the first logistic order and the second logistic order associated with the transaction order; and executing, in response to the states of the first logistic order and the second logistic order indicating that one of the first logistic order and the second logistic order is cancelled, a shipping operation only based on the uncancelled logistic order.

17. One or more non-transitory computer-readable storage media storing instructions executable by one or more processors to cause the one or more processors to perform operations comprising:

receiving, by one or more servers, a browse request for browsing detailed information of a combined merchandise object comprising a first sub-merchandise object and a second sub-merchandise object that are to be sold together as the combined merchandise object, and acquiring, by the one or more servers, stock information of each of the first sub-merchandise object and the second sub-merchandise object;

in response to determining, by the one or more servers, that a target physical warehouse has a physical stock of the first sub-merchandise object and no physical stock of the second sub-merchandise object, determining, by the one or more servers, whether a target virtual negative sale warehouse corresponding to the target physical warehouse has a virtual negative sale stock of the second sub-merchandise object;

in response to determining that the target virtual negative sale warehouse corresponding to the target physical warehouse has a virtual negative sale stock of the second sub-merchandise object, providing, by the one or more servers, salable information of the combined merchandise object;

in response to that a request for buying the combined merchandise object is received, generating, by the one or more servers, a transaction order; and generating, by the one or more servers, prerouting information for routing the combined merchandise object, the prerouting information indicating that the target physical warehouse is a prerouting warehouse of the first sub-merchandise object, and that the target virtual negative sale warehouse is a prerouting warehouse of the second sub-merchandise object.

18. The one or more non-transitory computer-readable storage media according to claim 17, wherein the salable information of the combined merchandise object comprises salable stock quantity information of the combined merchandise object, and the salable stock quantity information of the combined merchandise object is determined by:
   determining a stock quantity of each of the first sub-merchandise object and the second sub-merchandise object, and determining a minimum value of the determined stock quantities of the first sub-merchandise object and the second sub-merchandise object to be the salable stock quantity of the combined merchandise object.

19. The one or more non-transitory computer-readable storage media according to claim 17, wherein the operations further comprise:
   generating logistic orders associated with the transaction order by generating a first logistic order for the first sub-merchandise object and a second logistic order for the second sub-merchandise object according to different types of prerouting warehouses.

20. The one or more non-transitory computer-readable storage media according to claim 19, wherein the operations further comprise:
   shipping the combined merchandise object based on the logistic orders, the shipping comprising:
   combining the first logistic order and the second logistic order associated with the transaction order, and
   packaging the first sub-merchandise object and the second sub-merchandise object for shipping when detecting that there is a reserved negative sale stock of the second sub-merchandise object in the target physical warehouse.

* * * * *